(12) United States Patent
Ruckart

(10) Patent No.: US 8,175,255 B2
(45) Date of Patent: May 8, 2012

(54) METHODS, SYSTEMS AND COMPUTER-READABLE MEDIA FOR MANAGING CUSTOMER SERVICE REQUESTS

(75) Inventor: John Ruckart, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1318 days.

(21) Appl. No.: 11/513,699

(22) Filed: Aug. 31, 2006

(65) Prior Publication Data

US 2008/0192923 A1     Aug. 14, 2008

(51) Int. Cl.
*H04M 3/00* (2006.01)
(52) U.S. Cl. .............................. 379/265.09; 379/265.11
(58) Field of Classification Search ............. 379/265.02, 379/265.04, 265.11, 265.09; 709/201, 206; 717/101; 705/27, 7.11, 7.12; 370/352
See application file for complete search history.

(56) References Cited

U.S. PATENT DOCUMENTS

| | | | | | |
|---|---|---|---|---|---|
| 6,101,486 | A * | 8/2000 | Roberts et al. | ................... | 705/27 |
| 6,122,632 | A * | 9/2000 | Botts et al. | ............................ | 1/1 |
| 6,356,633 | B1 * | 3/2002 | Armstrong | ............... | 379/265.11 |
| 6,449,260 | B1 * | 9/2002 | Sassin et al. | ................... | 370/270 |
| 7,068,643 | B1 * | 6/2006 | Hammond | ..................... | 370/352 |
| 7,401,320 | B2 * | 7/2008 | Brunet et al. | .................. | 717/101 |
| 2002/0072921 | A1 * | 6/2002 | Boland et al. | ..................... | 705/1 |
| 2002/0141561 | A1 * | 10/2002 | Duncan et al. | ........... | 379/220.01 |
| 2002/0174170 | A1 * | 11/2002 | Ioffe et al. | ...................... | 709/201 |
| 2003/0035532 | A1 * | 2/2003 | Ganesan et al. | ......... | 379/265.04 |
| 2003/0065738 | A1 * | 4/2003 | Yang et al. | .................... | 709/215 |
| 2003/0172133 | A1 * | 9/2003 | Smith et al. | ................... | 709/219 |
| 2004/0062380 | A1 * | 4/2004 | Delaney | .................... | 379/265.02 |
| 2004/0078438 | A1 * | 4/2004 | Pyle et al. | ..................... | 709/206 |
| 2005/0165658 | A1 * | 7/2005 | Hayes et al. | .................... | 705/26 |
| 2006/0080130 | A1 * | 4/2006 | Choksi | .............................. | 705/1 |
| 2007/0071223 | A1 * | 3/2007 | Lee et al. | ................. | 379/265.02 |

* cited by examiner

*Primary Examiner* — Rasha Al Aubaidi
(74) *Attorney, Agent, or Firm* — Hope Baldauff Hartman, LLC

(57) ABSTRACT

Methods, systems, and computer-readable media provide for improved management of customer service requests. According to implementations, a customer requiring assistance from a company may send a message to a customer service representative ("CSR") associated with the company. The message is received and placed in a return contact queue. A customer profile database is referenced for information pertaining to the customer and any associated accounts. Additional databases may be referenced for information relating to the product or service that is the subject of the customer inquiry. Contact information is extracted from the message or other accumulated information. Upon reaching the front of the queue, the customer message and associated information is provided to the CSR. The CSR, with all pertinent information at hand, contacts the customer to provide assistance.

13 Claims, 5 Drawing Sheets

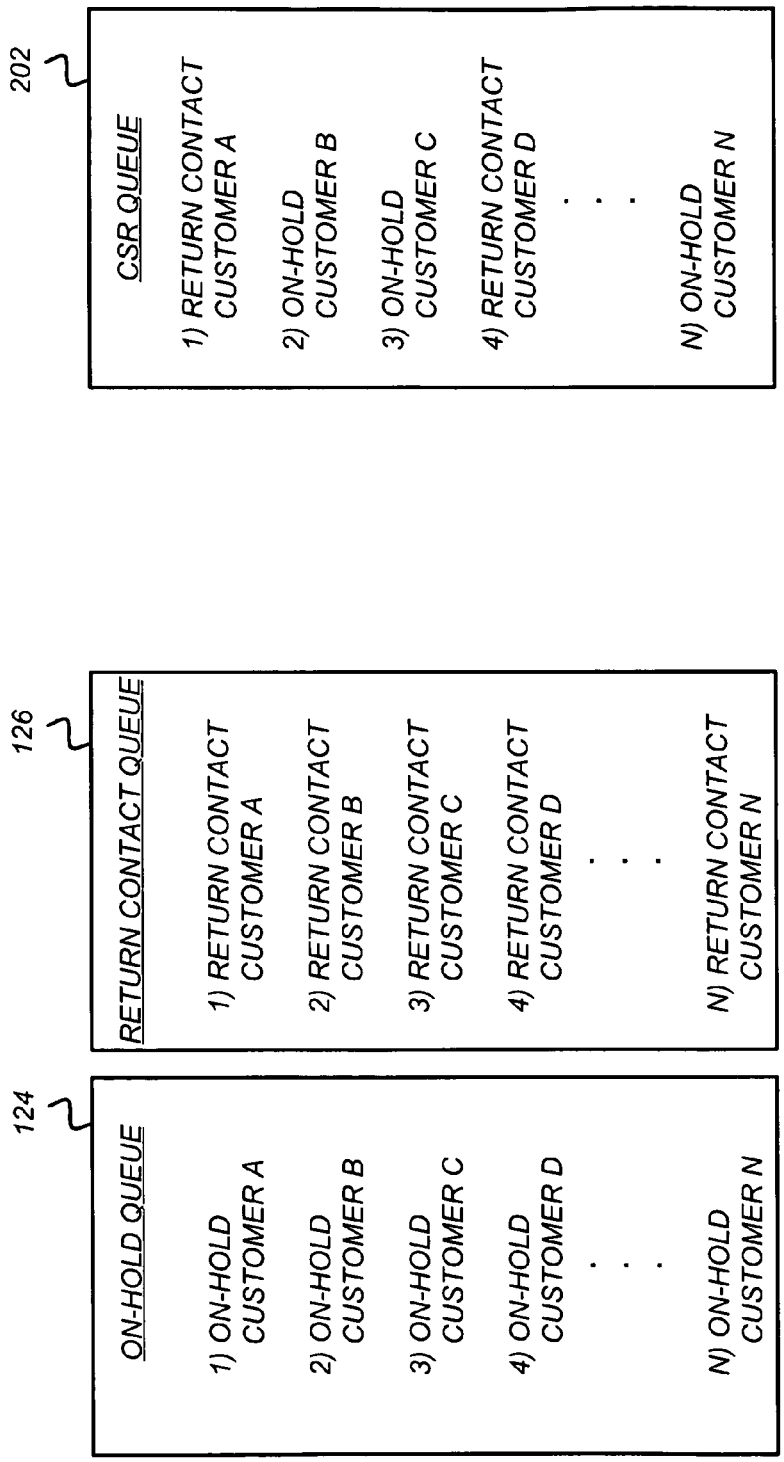

METHODS, SYSTEMS AND COMPUTER-READABLE MEDIA FOR MANAGING CUSTOMER SERVICE REQUESTS

TECHNICAL FIELD

This application relates generally to the field of providing improved customer service. More specifically, the disclosure provided herein relates to the field of providing enhanced return contact service to customers requesting assistance.

BACKGROUND

Companies that provide products or services to a large number of customers need an efficient method of providing assistance to those customers when problems arise with the purchased product or service, when a customer chooses to purchase additional products or services, when a customer chooses to discontinue a purchased service, or when a customer simply has questions or information requests. Providing efficient customer service can be a challenge to large companies that provide a wide range of services to a large number of customers, such as with telecommunications companies, cable and satellite television broadcast companies, power companies, and other utility companies. Most large companies utilize call centers, or centralized offices, for handling large volumes of calls from customer with problems or inquiries. Call centers typically include a large number of work stations having computers and telephones connected to a switch that are utilized by customer service representatives ("CSRs") to answer incoming calls from customers and render the appropriate services.

In an effort to minimize the amount of resources required at a call center, as well as to more efficiently handle customer service telephone calls, some companies utilize interactive voice response ("IVR") systems. An IVR system is a computerized system that allows callers to select options from a voice menu in an effort to direct a telephone call to a CSR qualified to assist the customer. In this manner, CSRs may specialize in particular categories of service, improving the probability that the CSR that ultimately answers a customer's telephone call will have the skills to properly assist the customer. As an example, a customer calling a telecommunications company may be asked to press "1" for billing questions, "2" to report a problem with telephone service, "3" to report a problem with internet service, "4" to inquire about new services, "5" to discontinue a service, "6" to request a transfer of services to a new address in the case of a home or office move, or "7" for all other assistance. By utilizing this IVR system, calls are routed to the appropriate CSRs who are able to become very efficient in a small area of expertise, which presumably connects a customer with a knowledgeable CSR who is well-qualified to assist the customer.

A problem with IVR systems today is that as companies increase the number of products and services that they provide, customers are required to sort through an increased number of menus and button presses before they are placed in a call queue for the appropriate CSR. This results in a large period of time that the customers are required to interact with a computer system before they are ultimately placed on-hold for another length of time prior to actually speaking with a human being that may or may not be able to assist them. Some companies are even requiring customers to troubleshoot their problems via computer-directed instructions over the telephone prior to placing the call in a queue to speak to a human CSR. While this computer-directed troubleshooting tree, as well as IVR systems in general, are effective to filter out a number of customer calls before placed in a queue for a CSR, it is increasingly frustrating to customers who would like to speak to a human CSR and receive assistance in a timely manner.

SUMMARY

According to one aspect of the disclosure presented herein, methods, systems, and computer-readable media are provided to manage customer service requests. According to one implementation, a method includes receiving a message from a customer that includes a customer service request. A CSR queue is modified to add a representation of the message received from the customer. The CSR queue defines the order in which the customer will be assisted by the CSR. When the customer is to be assisted according to the CSR queue, customer profile information associated with the customer is retrieved and presented to the CSR, along with the message and contact information associated with the customer. The message from the customer may comprise a Short Message Service ("SMS") message, a customer identifier, and a routing indicator.

A customer service database may be searched for customer service history information corresponding to the customer identifier and the routing indicator. This information may be presented to the CSR along with the message, the customer profile information, and customer contact information to better assist the CSR in supporting the customer. If the message includes a customer service request, a customer service database is searched for an auto-response corresponding to the request, which if found, is subsequently retrieved and transmitted to the customer.

According to another aspect of the disclosure presented herein, a computer-readable medium provides computer-executable instructions that cause the computer to receive a message from a customer and determine if the message includes a routing indicator. If the message includes a routing indicator, a customer service database is searched for the routing indicator and corresponding routing instructions. If the routing indicator is found in the database, then the message is routed according to the corresponding instructions to a target CSR and placed in a queue. If the message does not include a routing indicator, or if the routing indicator is not found in the customer service database, then the message is routed to a generic CSR and placed in a corresponding queue. Customer contact information is retrieved and presented to the corresponding target or generic CSR along with the message when the message advances to the front of the corresponding queue. The target or generic CSR is instructed to contact the customer using the provided contact information to provide assistance.

According to yet another aspect of the disclosure presented herein, a computer-readable medium provides computer-executable instructions that cause the computer to receive a non-verbal communication associated with a customer. A determination is made as to whether the communication includes a request for account information. If so, then the requested account information is retrieved and transmitted to the customer. If the communication does not include a request for account information, then the communication is represented in a CSR queue. When the representation of the communication has advanced to the front of the CSR queue, the contact information is presented with the communication to the CSR and the CSR is instructed to contact the customer to provide assistance.

Other systems, methods, and/or computer program products according to embodiments will be or become apparent to one with skill in the art upon review of the following drawings and Detailed Description. It is intended that all such additional systems, methods, and/or computer program products be included within this description, be within the scope of the disclosure presented herein, and be protected by the accompanying claims.

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 2A and 2B are block diagrams showing illustrative examples of CSR queues according to various embodiments presented herein.

DETAILED DESCRIPTION

Figure 1:
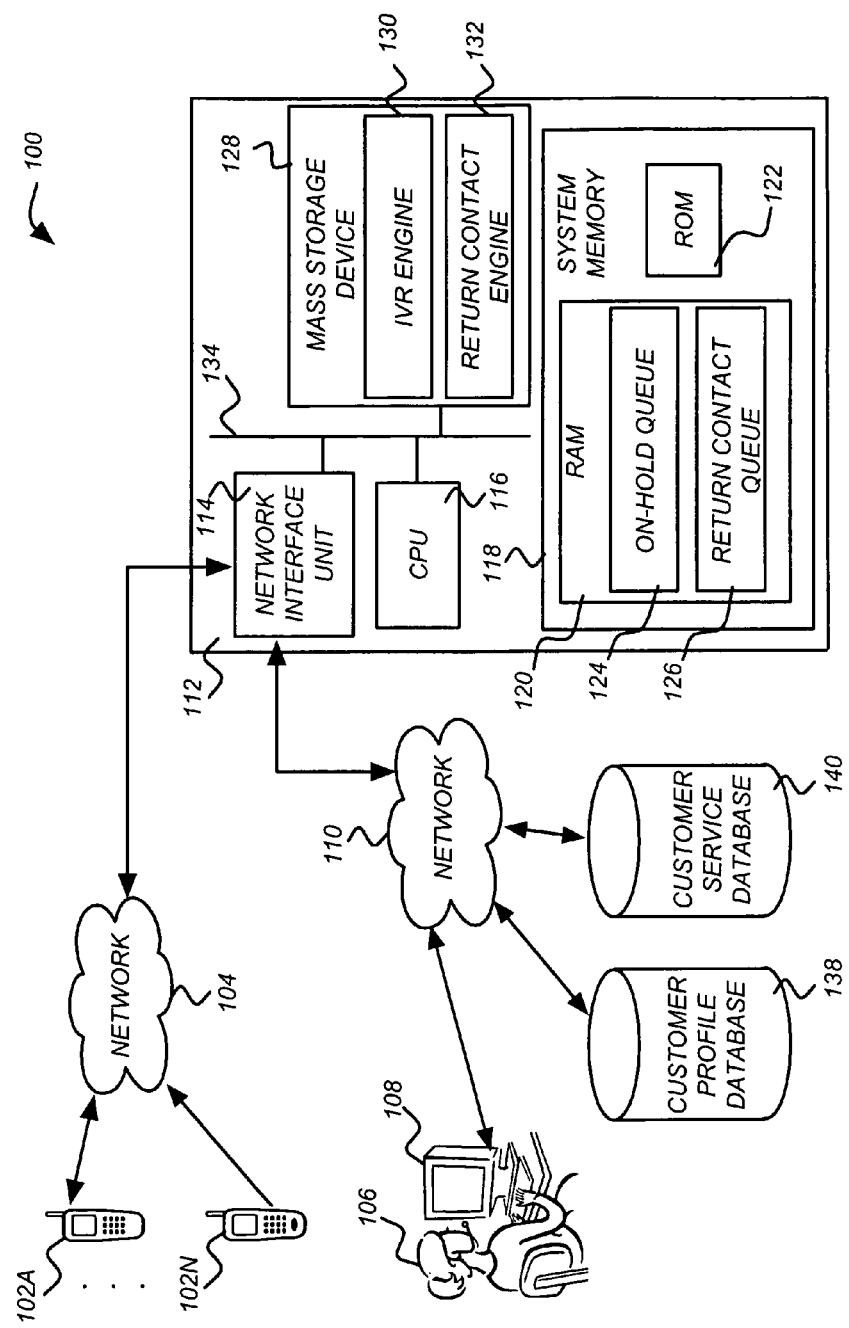
FIG. 1 is a block diagram showing aspects of an illustrative operating environment for the disclosure presented herein.

The following detailed description is directed to methods, systems, and computer-readable media for managing customer service requests. According to implementations provided herein, a customer requiring assistance from a company may send a message to a customer support representative ("CSR") associated with the company rather than make a telephone call and attempt to speak directly to a CSR. The message is received and placed in a return contact queue. A customer profile database is referenced for information pertaining to the customer and any associated accounts. Additional databases may be referenced for information relating to the product or service that is the subject of the customer inquiry. Contact information is extracted from the message or other accumulated information. Upon reaching the front of the queue, the customer message and associated information is provided to the CSR. The CSR, with all pertinent information readily available, contacts the customer to provide assistance. The customer submits a single message before being called back by a human CSR and does not have to endure lengthy automated messages, computer interaction, and telephone call hold periods. In the following detailed description, references are made to the accompanying drawings that form a part hereof, and which are shown by way of illustration specific embodiments or examples. Referring now to the drawings, in which like numerals represent like elements through the several figures, aspects of the methods and computer-readable media provided herein will be described.

FIG. 1 and the following discussion are intended to provide a brief, general description of a suitable computing environment in which embodiments of the disclosure herein may be implemented. While the various implementations will be described in the general context of program modules that execute in conjunction with an application program that runs on an operating system on a computer system, those skilled in the art will recognize that the disclosure provided herein may also be implemented in combination with other program modules.

Generally, program modules include routines, programs, components, data structures, and other types of structures that perform particular tasks or implement particular abstract data types. Moreover, those skilled in the art will appreciate that the disclosure provided herein may be practiced with other computer system configurations, including hand-held devices, multiprocessor systems, microprocessor-based or programmable consumer electronics, minicomputers, mainframe computers, and the like. The implementations may also be practiced in distributed computing environments where tasks are performed by remote processing devices that are linked through a communications network. In a distributed computing environment, program modules may be located in both local and remote memory storage devices.

Turning now to FIG. 1, an illustrative operating environment 100 for practicing the disclosure presented herein will now be described. In particular, a customer may use a communication device 102A-102N to contact and communicate with a CSR 106 at a workstation 108 to assist in answering customer questions regarding a product or service as well as identifying and solving one or more problems the customer may be experiencing with the product or service. The communication device 102 may include any device capable of sending and receiving communications including, but not limited to, a cellular telephone, a Plain Old Telephone Service ("POTS") telephone, a Voice over Internet Protocol ("VoIP") telephone, a WI-FI telephone, a WiMAX telephone, a computer, a Personal Data Assistant (PDA), or an entertainment device such as a television or game console. According to the example shown in FIG. 1, a customer associated with the communication device 102A establishes bidirectional voice communications with the CSR 106 via a server computer 112, while a customer associated with the communication device 102N sends a unidirectional message to the CSR 106 via the server computer 112 for return contact according to implementations described in greater detail below with respect to FIGS. 3A-3C. It should be understood that the bidirectional communication may occur via a telephone call, instant message, video conference or any other forms of real-time communication, while the unidirectional message may be sent via any bidirectional method such as those described above, or via text message or other Short Message Service ("SMS") communication, electronic mail, voice message, or other forms of sending a unidirectional message.

According to an implementation described herein, the communication devices 102A-102N and the server computer 112 communicate via a network 104. The network 104 may include a wireless network such as, but not limited to, a Wireless Local Area Network (WLAN) such as a WI-FI network, a Wireless Wide Area Network (WWAN), a Wireless Personal Area Network (WPAN) such as BLUETOOTH, a Wireless Metropolitan Area Network (WMAN) such a WiMAX network, a cellular network, or a satellite network. Alternatively, the network 104 may be a wired network such as, but not limited to, a wired Wide Area Network (WAN), a wired (Local Area Network) LAN such as the Ethernet, a wired Personal Area Network (PAN), or a wired Metropolitan Area Network (MAN). The network 104 may include the Internet such that the communication devices 102A-102N communicate with the server computer 112 via wireless or wired connections to the Internet.

As shown in FIG. 1, a network 110 connects the CSR 106 and workstation 108 to the server computer 112. As stated above with respect to the network 104, the network 110 may comprise any type of wireless computing network including, but not limited to, a WLAN such as a WI-FI network, a WWAN, a WPAN such as BLUETOOTH, a WMAN such a WiMAX network, a cellular network, a satellite network or any type of wired computing network including, but not limited to, a WAN such as the Internet, a LAN such as the Ethernet, a PAN, or a MAN. The network 110 provides a medium for enabling communication between the CSR 106 and workstation 108, the server computer 112, and other computer systems or components connected to or accessible through the network 10, such as a customer profile database 138 and a customer service database 140 discussed below. The network 110 may include the Internet such that the server computer 112 communicates with other computer systems or components via a wireless or wired connection to the Internet.

It should be understood that the server computer 112 may be located at a call center that includes the CSR 106 and corresponding workstation 108, or may be at a location that is remote from the CSR 106 and workstation 108. The server computer 112 may be in communication with, or may provide the functionality of, a telecom switch operative to connect the communications devices 102A-102N to the CSR 106 and the workstation 108. In this manner, the server computer 112 may connect voice calls from customers to the CSR 106. While only one CSR 106 is shown in FIG. 1 for clarity, it should be appreciated that the server computer 112 may be in communication with any number of CSRs 106 and workstations 108. The CSR 106 utilizes the workstation 108 to access information provided by the server computer 112, or by any number of associated computer systems or databases, such as the customer profile database 138 and the customer service database 140 described below.

The workstation 108 may be any type of computing device. For example, the workstation 108 may include a central processing unit ("CPU"), a system memory, including a random access memory ("RAM") and a read-only memory ("ROM"), and a system bus that couples the system memory to the CPU. The workstation 108 may connect to the network 110 through a network interface unit connected to the bus of the workstation. It should be appreciated that the network interface unit may also be utilized to connect to other types of networks and remote computer systems. The workstation 108 may also include an input/output controller for receiving and processing input from a number of other devices, including a keyboard, mouse, scanner, digital computer, or electronic stylus. Similarly, the input/output controller of the workstation 108 may provide output to a display screen, a printer, or other type of output device.

The server computer 112 may include a standard server computer specially programmed as set forth in more detail below to provide services to other computing systems, such as the workstation 108, over the network 110. The server computer 112 is operative to store and execute an IVR engine 130 and a return contact engine 132 as will be described below. The server computer 112 may include a CPU 116, a system memory 118 including RAM 120 and ROM 122, a mass storage device 128, and a system bus 134 that couples the system memory 118 and the mass storage device 128 to the CPU 116. The server computer may also include a web server (not shown) for receiving messages and other communications from the communication devices 102A-102N via a website interface. The CPU 116 of the server computer 112 may be a standard central processor that performs arithmetic and logical operations, a more specific purpose programmable logic controller ("PLC"), a programmable gate array, or other type of processor known to those skilled in the art and suitable for controlling the operation of the server computer. CPUs are well-known in the art, and therefore not described in further detail herein. The mass storage device 128 is connected to the CPU 116 through a mass storage controller (not shown) connected to the bus 134. The mass storage device 128 and its associated computer-readable media provide non-volatile storage for the server computer 112. Although the description of computer-readable media contained herein refers to a mass storage device, such as a hard disk or CD-ROM drive, it should be appreciated by those skilled in the art that computer-readable media can be any available media that can be accessed by the server computer 112.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the server computer 112.

The mass storage device 128 stores the IVR engine 130 for filtering incoming bidirectional communications from customers and placing the customer communications in an on-hold queue 124 for response by the CSR 106 as described below. Additionally, according to the disclosure presented below, the mass storage device 128 stores the return contact engine 132 for receiving incoming customer messages, retrieving information from databases 138 and 140, and placing the messages in a return contact queue 126 for action to be taken by the CSR 106. The RAM 120 stores the on-hold queue 124 and the return contact queue 126, both of which will be described in detail below with respect to FIGS. 2A and 2B.

The customer profile database 138 stores customer account information. This information includes customer identification information such as customer names, addresses, and contact information. Additionally, the customer profile database 138 may include account information such as the identification and the quantity of products or services bought, account numbers, account creation and expiration dates, and service histories. The customer service database 140 is a generic representation of any number of databases that may be used to store any type and quantity of information relating to the customers, the company, the products and services provided by the company, and maintenance histories and current status, and any other information that may be used in assisting customers with their customer service requests. It should be appreciated that the customer profile database 138 and the customer service database 140 may be a single database or multiple databases either located remotely from the server computer 112 and the workstation 108, or directly connected to internal bus 134 of the server computer 112 or an internal bus of the workstation 108.

It should be understood that the IVR engine 130 and the return contact engine 132 are applications that when executed by the CPU 116, receive communications from communications devices 102A-102N, retrieve data as necessary from appropriate databases 138 and 140, and place the communications in the appropriate queues 124 and 126 until which time the communication and any necessary information is presented to the CSR 106 and the workstation 108. Prior to discussing the details of the process employed by the return contact engine 132 according to implementations described in FIGS. 3A-3C, practical examples of a customer service request made via a telephone call and a customer service request according to implementations described herein using a unidirectional message will be described with respect to FIG. 1.

First, an example of a typical customer service request will be discussed. Looking at FIG. 1, a telephone call is placed to a company using a telephone 102A. It should be appreciated that while the example utilizes a telephone and corresponding telephone call, any bidirectional communication method may be utilized such that the customer is communicating with the IVR engine 130 or CSR 106 in real time. The telephone call is received by the server computer 112 at a network interface unit 114. The IVR engine 130 initiates a series of menus, transmitting automated requests to the customer asking her to select one of a series of options by either pressing buttons on the telephone corresponding to her choices, or by speaking the number of her choices into the telephone. After advancing through the appropriate menu selections, the call is then placed in an on-hold queue for the appropriate CSR 106. The customer waits on-hold for the amount of time that it takes the appropriate CSR 106 to assist the volume of calls that were placed in the on-hold queue in front of the customer's call. After progressing through the numerous menu selections and waiting for the CSR 106 to become available, the customer's call is finally answered by the CSR 106 and the customer is assisted.

A simplified example of a customer service request according to implementations described herein will now be illustrated. A customer needing assistance sends a text message to a company using a cellular telephone 102N. The message is received by the server computer 112 at the network interface unit 114 and routed to the return contact engine 132. The return contact engine 132 places the message in a return contact queue 126. It should be understood that the contents of the message may be stored within the return contact queue 126, or the message content may be stored elsewhere with a customer representation data structure stored within the return contact queue 126 that contains information used by the return contact engine 132 to locate and retrieve the message contents when the customer representation advances to the front of the queue. The return contact engine 132 retrieves information pertaining to the customer and her accounts from the customer profile database 138, as well as any other pertinent service information from the customer service database 140. Contact information for the customer is extracted from the message or the customer profile obtained from the customer profile database 138. When the message advances to the front of the return contact queue 126, the return contact engine 132 presents the message and any other pertinent information to the CSR 106 and the corresponding workstation 108. The CSR 106 contacts the customer using the contact information provided by the return contact engine 132. All information necessary to assist the customer is displayed on the workstation 108. The details of this process, as well as various implementations of this process, will be described fully below with respect to FIGS. 3A-3C.

FIG. 2A shows examples of the on-hold queue 124 and the return contact queue 126. Each queue 124 and 126 lists the respective customers in the order in which the communication was received. For example, on-hold customer N was the last customer to call for that particular CSR 106 and will not be assisted until on-hold customers A-D are assisted. On-hold customer A is the next customer to be assisted. Likewise, the return contact customer N was the lasts customer to send a message and will not be assisted until the return contact customers A-D are assisted. It should be understood that there may be separate CSRs for assisting the return contact customers than the CSRs who handle the customers who are on-hold. Alternatively, a single CSR may assist both on-hold customers and return contact customers utilizing both queues 124 and 126, respectively. The order in which customers are assisted may be alternately from one queue to the other, or may be according to a priority system. For example, on-hold customers may be given priority over the return contact customers since they are actually on-hold and therefore more inconvenienced. According to another implementation shown in FIG. 2B, a customer message is placed in a CSR queue 202 that includes all incoming calls and messages. With this implementation, each CSR 106 assists both on-hold customers as well as return contact customers in the order in which they are placed in the CSR queue 202.

Figure 3A:
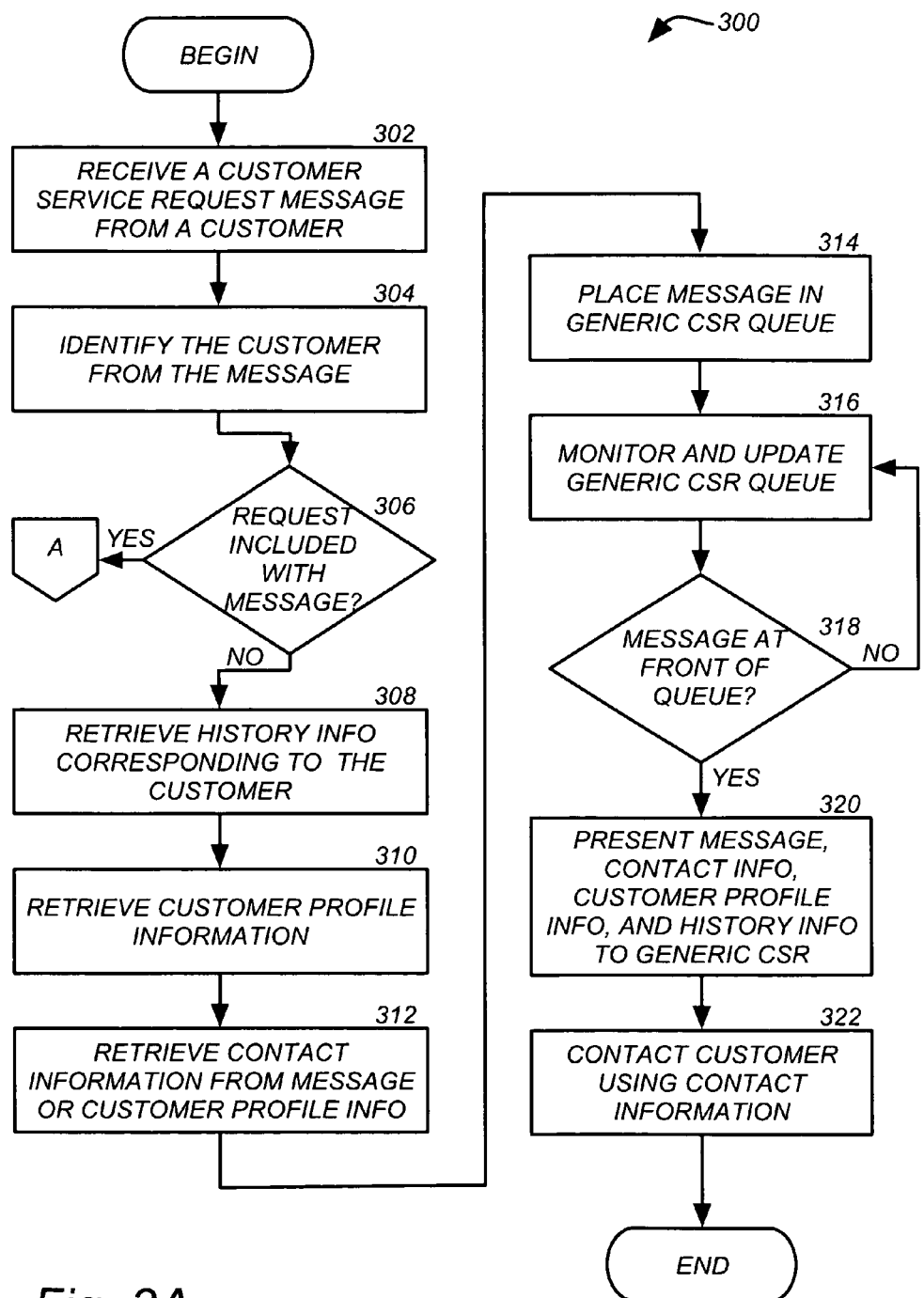
FIGS. 3A-3C are flow diagrams illustrating methods provided herein for managing customer service requests according to various embodiments presented herein.
Figure 3B:
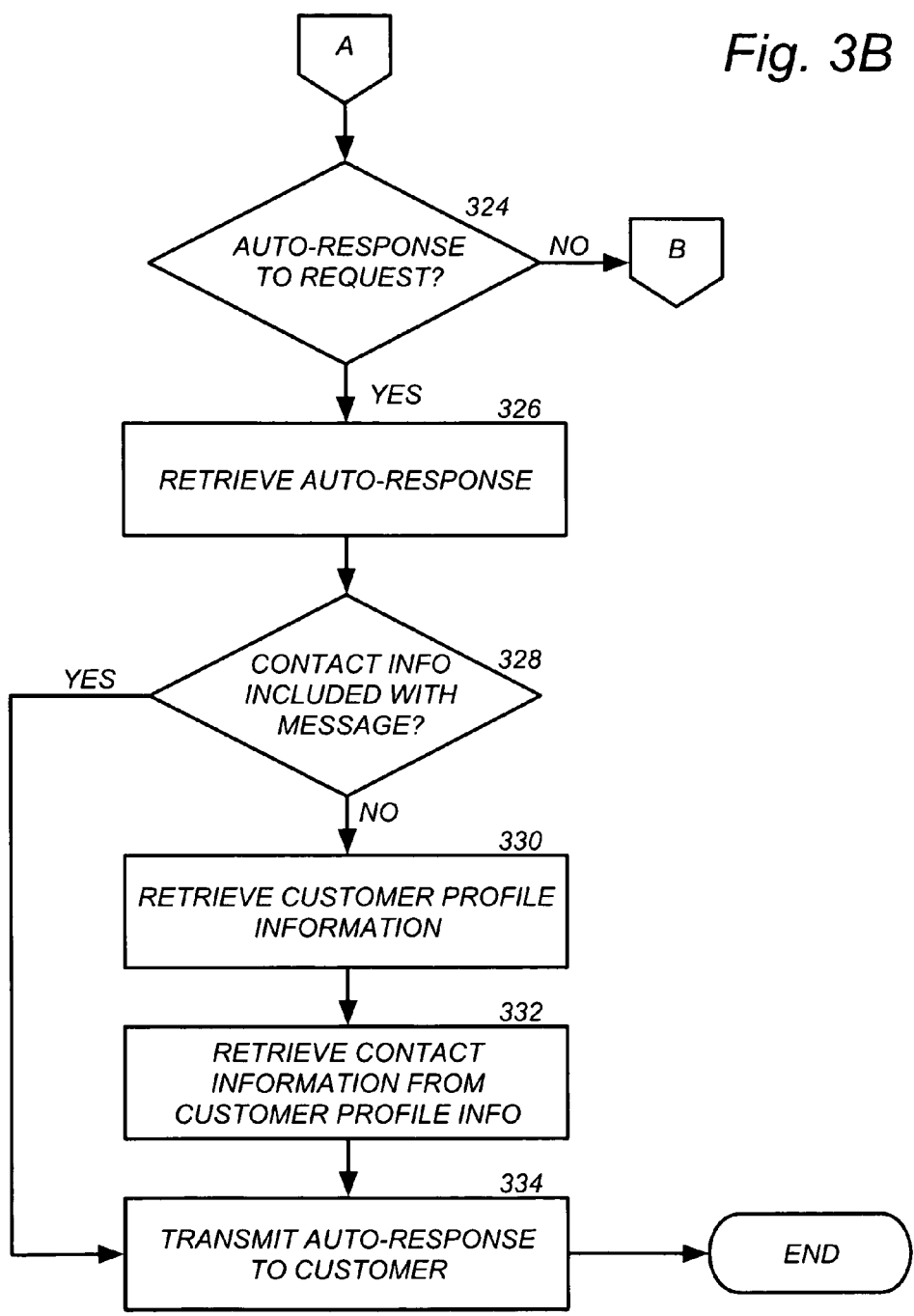
Figure 3C:
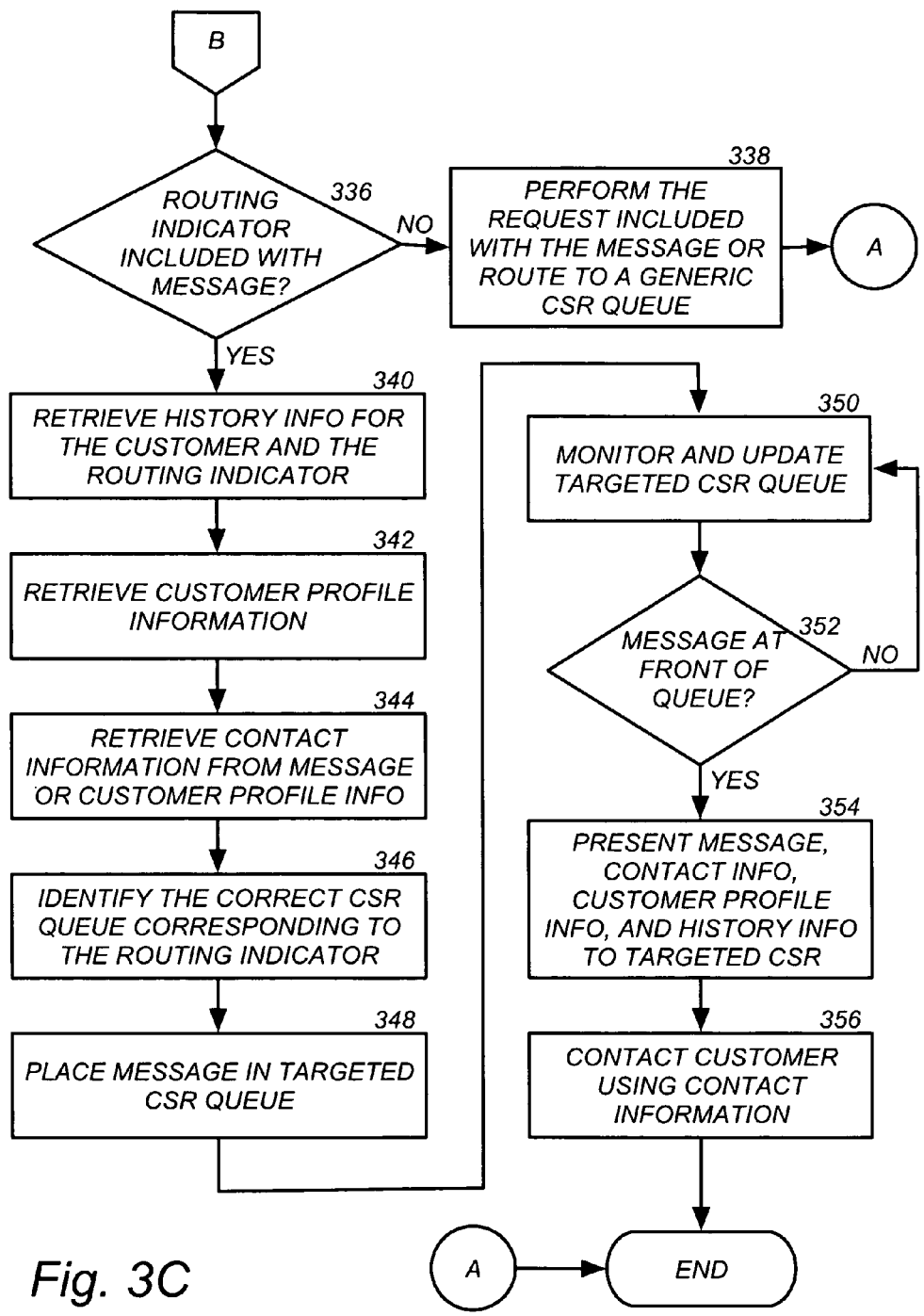

Referring now to FIGS. 3A-3C, an illustrative routine 300 will be described for managing customer service requests according to various embodiments presented herein. It should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

Turning to FIG. 3A, an illustrative routine 300 for managing a customer request received as a unidirectional message will be described. The routine 300 begins at operation 302, where a customer service request message is received at the server computer 112. As discussed briefly above, the message may be a text message, an electronic mail, a voice message, or any other unidirectional message wherein two-way communication is not established. It should be appreciated that the message may also be transmitted from a bidirectional communication means such as an instant message or telephone call. A confirmation message confirming the receipt of the customer service request message may be optionally sent back to the communication device 102N via the same message type and transmission means used by the original message, or by any other means specified by the customer profile database 138. From operation 302, the routine 300 proceeds to operation 304, where the return contact engine 132 identifies the customer from the message. This identification can occur through any number of methods. The message itself may include a customer name. The message may include a telephone number that can be used to identify the customer using the customer profile database 138. Similarly, an identifying number of the communication device 102N may be obtained and used to identify the customer using the customer profile database 138. Additionally, traditional caller ID methods may be used to identify a customer associated with the communication device 102N.

The routine 300 continues from operation 304 to operation 306, where the return contact engine 132 makes a determination as to whether a request is included with the message. The message may include a request that does not require direct communication with the CSR 106. For example, a customer may request an account balance, the date of her last payment, or to initiate or to terminate a service. This determination may be made using various techniques. The return contact engine 132 may search for keywords or phrases that indicate common requests. Alternatively, request codes defined by the company may be utilized by the customers. For example, the company may publish a set of codes on their website and other literature that customers may use to direct the company to perform certain actions or to request information from the company. A text message with the letters "AB" may direct the company to reply with the customer's account balance. In yet another implementation, the return contact engine 132 may be operative to present a customer message to a human operator for action when the message contains information that is not recognized by the engine 132. It should be appreciated that these techniques for recognizing and acting upon information contained within a customer message are applicable to any operation described herein in which the return contact engine 132 must extract, recognize, and/or act upon information contained within the customer message, including but not limited to operations 312, 328, 336, and 338 described below.

Prior to responding to a request received from a customer via a message, an authentication procedure may be utilized to ensure that the sender of the message is actually the customer from whom the message appears to be sent. Authentication procedures are well-known and may include the use of one or more passwords corresponding to any given request or instruction from the customer. Additionally, the customer profile database 138 may include an authorized list of communication devices 102A-102N that may be used to make requests or give instructions. Device identifications sent with the customer messages may then be compared to the authorized list of devices to ensure proper customer authentication.

Returning to operation 306, if the return contact engine 132 determines that a request is included with the message, the routine 300 proceeds to operation 324 described below with respect to FIG. 3B. However, if a request is not included with the message, then the routine 300 continues to operation 308, where the return contact engine 132 retrieves customer service history information from the customer service database 140. This customer service history information may include any instances of related customer service requests within a predetermined time period and the actions taken by the company. For example, the customer service database 140 may store all maintenance and service instances for each customer for the preceding 12 months. A message from "John Smith" prompts the return contact engine 132 to search the customer service database 140 for all instances corresponding to John Smith. The search may reveal that John Smith has experienced duplicate problems with his telephone service within the last two months. Each instance of the telephone problem resulted in the same response by the telephone company. This information is valuable to the CSR 106 since a different solution may now be necessary or a more in-depth troubleshooting procedure may be required to determine the source of the problem.

It should be appreciated that the customer service history information may be retrieved and stored with the message in the return contact queue 126, or the message or other customer representation stored in the return contact queue 126 may contain a tag that triggers the return contact engine 132 to retrieve the customer history information for delivery to the workstation 108 when the message or other customer representation advances to the front of the return contact queue 126. As yet another alternative, the return contact engine 132 may search the customer service database 140 for customer history information only when the message or other customer representation has advanced to the front of the queue and is ready for delivery to the CSR 106 and the corresponding workstation 108.

From operation 308, the routine 300 proceeds to operation 310, where the return contact engine 132 retrieves customer profile information from the customer profile database 138. This information includes any information about the customer or about the customer's account that might be beneficial to the CSR 106 when assisting the customer. The routine 300 continues from operation 310 to operation 312, where the return contact engine 132 retrieves contact information for the customer. This contact information may be included in the customer message. For example, the customer may have transmitted a text message that included the customer's name and a telephone number where she may be contacted. Additionally, a customer may include parameters for the return contact. For example, a customer may send a text message with her name, telephone number, and instructions to contact her between 2 pm and 4 pm. The customer contact information may alternatively be retrieved from the customer's profile stored within the customer profile database 138. When a customer purchases a product or service, she may be asked to provide information for establishing a customer profile. This information may include preferred means for contacting the customer, including primary and secondary contact methods.

Returning now to FIG. 3A, the routine 300 continues from operation 312 to operation 314, where the customer message, or a customer representation data structure as discussed above, is placed in a generic CSR queue. The term "generic" is used since the customer message according to this implementation does not include any information that indicates a request or other identifier that would allow the return contact engine 132 to route the message to a targeted CSR that specializes in the customer's type of problem or request. One or more CSRs 106 may be assigned to handle the generic return contact queue 126. From operation 314, the routine 300 continues to operation 316, where the return contact engine 132 monitors the return contact queue 126 and updates the queue as other messages are delivered to the CSR 106 and the corresponding customers are assisted. At operation 318, a determination is made as to whether the customer message is at the front of the queue 126. If not, then the routine 300 returns to operation 316 and the return contact queue 126 continues to be monitored and updated. If the message has advanced to the front of the return contact queue 126 at operation 318, the routine 300 continues to operation 320, where the return contact engine 132 transmits the message, contact information, customer profile information, and customer service history information to the workstation 108 for action by the CSR 106 assisting with the generic messages. At operation 322, the CSR 106 contacts and assists the customer using the contact information provided by the return contact engine 132 and the routine 300 ends.

Returning now to operation 306, if the return contact engine 132 determines that a request is included with the customer message, then the routine 300 proceeds to operation 324, where the return contact engine 132 determines whether an auto-response exists corresponding to the customer request. The server computer 112 may store pre-recorded or voice synthesized responses to common customer requests within the customer service database 140. The return contact engine 132 determines whether an auto-response corresponding to the customer request exists by comparing the request to a lists of requests stored along with corresponding auto-responses. It should be appreciated that the auto-response determination operation 324, as well as any other operation described herein, is optional and may be utilized according to the desired message-filtering features of the routine 300.

One example of an auto-response may be a recording that informs a customer that there is an outage in her area that is being worked by maintenance crews. Other auto-responses may include pre-recorded responses to common requests, requiring the return contact engine 132 to retrieve the requested information and insert that information into the pre-recorded response for transmittal to the customer. For example, a customer may send a text message requesting the balance in a specific account. The return contact engine 132 recognizes that request using methods discussed above, retrieves the requested balance from the customer service database 140 after authenticating the customer, inserts the balance into a pre-recorded response, and transmits the response to the customer so that the customer receives a voice recording stating, "your balance for account number XXXXX is $2000.00." Alternatively, it should be understood that the auto-response may be sent via any transmission media in any format selected by the return contact engine 132 or according to the customer's preferences stored within the customer profile database 138.

Returning to operation 324, if the return contact engine 132 determines that there is no auto-response to the request, the routine 300 proceeds to operation 336 and proceeds as described below with respect to FIG. 3C. However, if the return contact engine 132 determines that there is an auto-response corresponding to the customer request, then the routine 300 proceeds to operation 326, where the return contact engine 132 retrieves the corresponding auto-response from the customer service database 140. From operation 326, the routine 300 continues to operation 328, where the return contact engine 132 determines whether customer contact information is included with the customer message. If contact information is included with the message, the routine 300 proceeds to operation 334, where the return contact engine 132 transmits the auto-response to the customer using the contact information and the routine 300 ends. If, however, customer contact information is not included with the customer message, then the routine 300 proceeds from operation 328 to operation 330, where the return contact engine 132 retrieves customer profile information from the customer profile database 138. Customer contact information is then retrieved from the customer profile information by the return contact engine 132 at operation 332. From operation 332, the routine 300 proceeds to operation 334, where the return contact engine 132 transmits the auto-response to the customer using the contact information and the routine 300 ends.

Returning now to operation 324, if the return contact engine 132 determines that there is no auto-response to the customer request, then the routine 300 proceeds to operation 336, where the return contact engine 132 determines whether a routing indicator is included with the customer message. According to implementations described herein, a routing indicator may be any keyword, phrase, abbreviation, number, symbol, or other indicator that would designate or suggest the proper CSR routing for the message. For example, the customer may send a message that includes an indication of her problem or inquiry, such as "billing question," "Internet connection not working," or "new service." The return contact engine 132 searches the customer message for these keywords or other indicators and compares them to a list of routing indicators to determine the proper CSR 106 in which to route the message. Therefore, at operation 336, the return contact engine 132 determines whether the message includes a routing indicator. If no routing indicator is found, then the routine 300 proceeds to operation 338, where the return contact engine 132 performs the request that was included with the message, or routes the request to a generic return contact queue 126 for action by a CSR 106 or other entity that can perform the request and the routine 300 ends.

For clarity, an example illustrating the flow of a message that includes a customer request through the routine 300 to operation 338 will be described. A customer may send a text message to a company with her name and any authentication information, along with the text "change address to 123 Main Street." The message is received by the return contact engine 132 at operation 302 and the customer is identified by the name received with the message at operation 304. At operation 306, the return contact engine 132 determines that a request is included with the message since in this example, the text "change address to 123 Main Street" requests that an action be taken. The routine proceeds to operation 324, where the return contact engine 132 determines that there is not an auto-response corresponding to the text "change address to 123 Main Street." As a result, the routine continues to operation 336, where the return contact engine determines that there is not a routing indicator included with the message since a search for the text "change address to 123 Main Street" within the customer service database 140 resulted in no match and corresponding routing instructions. The routine 300 proceeds to operation 338, where the return contact engine 132 performs the request by changing the address in the customer profile database 138, or by routing the message and request to a generic return contact queue 126 for action by a CSR 106 that is identified for handling requests. A confirmation may or may not be sent to the customer as a result of the action, but the request did not require or request an immediate return contact. In many situations, operation 338 is a catch-all operation for data that is not identified by the return contact engine 132. In these situations, the message and corresponding request may be forwarded to a CSR 106 identified for handling these catch-all situations as described above.

Returning to operation 336, if the return contact engine 132 determines that a routing indicator is included with the message, then the routine 300 continues to operation 340, where the return contact engine 132 retrieves customer service history corresponding to the customer and the routing indicator from the customer service database 140. As described above, the return contact engine 132 searches the customer service database 140 for any service instances relating to the customer, and specifically, relating to the routing indicator included with the message. The routine 300 continues to operation 342, where the return contact engine 132 retrieves customer profile information from the customer profile database 138 as described above. From operation 342, the routine 300 proceeds to operation 344, where the return contact engine 132 retrieves contact information for the customer from either the customer message or from the customer profile information. The routine 300 continues from operation 344 to operation 346, where the return contact engine 132 identifies the correct return contact queue 126 corresponding to the routing indicator included with the message. As discussed above, CSRs 106 and their corresponding return contact queues 126 are targeted to a specialized issue, such as billing questions, new service request, or problems associated with a specific product or service.

From operation 346, the routine 300 continues to operation 348, where the customer message, or a customer representation data structure as discussed above, is placed in a targeted CSR return contact queue 126. The term "targeted" is used since the customer message according to this implementation includes information that indicates a specialized issue corresponding to a specific CSR 106. From operation 348, the routine 300 continues to operation 350, where the return contact engine 132 monitors the return contact queue 126 and updates the queue as other messages are delivered to the CSR 106 and the corresponding customers are assisted. At operation 352, a determination is made as to whether the customer message is at the front of the queue 126. If not, then the routine 300 returns to operation 350 and the return contact queue 126 continues to be monitored and updated. If the message has advanced to the front of the return contact queue 126 at operation 352, the routine 300 continues to operation 354, where the return contact engine 132 transmits the message, contact information, customer profile information, and customer service history information to the workstation 108 for action by the CSR 106 assisting with the targeted messages. At operation 356, the CSR 106 contacts and assists the customer using the contact information provided by the return contact engine 132 and the routine 300 ends.

Although the subject matter presented herein has been described in conjunction with one or more particular embodiments and implementations, it is to be understood that the invention defined in the appended claims is not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for managing customer service requests, the method comprising:

receiving, at a server computer of a call center, a unidirectional message from a return contact customer, the unidirectional message requesting the call center to return contact to the return contact customer;

searching content of the unidirectional message to determine whether the content comprises a request that does not require direct communication with a customer service representative;

in response to determining that the content of the unidirectional message does not comprise a request, modifying a generic customer service representative queue to add a representation of the unidirectional message to the generic customer service representative queue, wherein the generic customer service representative queue comprises a first on-hold customer representation for a first on-hold customer that is currently on-hold with the call center, and wherein the generic customer service representative queue defines a first order in which the return contact customer will be assisted by a first customer service representative assigned to handle generic messages, the first order specifying priority to the first on-hold customer over the return contact customer, searching a customer service database for customer service history information related to the return contact customer, wherein the customer service history information comprises customer service requests made by the return contact customer within a predetermined time period, retrieving the customer service history information, and presenting the customer service history information to the first customer service representative assigned to handle the generic messages once the unidirectional message arrives at a front of the generic customer service representative queue;

in response to determining that the content of the unidirectional message comprises a request, comparing the request to a list of requests associated with corresponding auto-responses to determine whether an auto-response exists corresponding to the request of the unidirectional message;

in response to determining that an auto-response corresponding to the request of the unidirectional message exists, retrieving the auto-response and inserting the auto-response into a response to the unidirectional message;

in response to determining that an auto-response corresponding to the request of the unidirectional message does not exist, searching the content of the unidirectional message to determine whether the content comprises a routing indicator corresponding to a specialized issue;

in response to determining that the content of the unidirectional message comprises a routing indicator, modifying a targeted customer service representative queue to add a representation of the unidirectional message to the targeted customer service representative queue, wherein the targeted customer service representative queue comprises a second on-hold customer representation for a second on-hold customer that is currently on-hold with the call center, and wherein the targeted customer service representative queue defines a second order in which the return contact customer will be assisted by a second customer service representative assigned to handle the specialized issue, the second order specifying priority to the second on-hold customer over the return contact customer; and in response to determining that the content of the unidirectional message does not comprise a routing indicator, modifying the generic customer service representative queue to add a representation of the unidirectional message to the generic customer service representative queue.

2. The method of claim 1, further comprising in response to determining that the content of the unidirectional message does not comprise a request:

retrieving customer profile information associated with the return contact customer from a customer profile database; and presenting the unidirectional message, contact information associated with the customer, and the customer profile information to the first customer service representative assigned to handle the generic messages once the unidirectional message arrives at a front of the generic customer service representative queue.

3. The method of claim 2, wherein the unidirectional message comprises the contact information associated with the return contact customer.

4. The method of claim 1, wherein the unidirectional message comprises a short message service message.

5. The method of claim 1, further comprising in response to determining that the content of the unidirectional message comprises a routing indicator, comparing the routing indicator to a list of routing indicators to determine the second customer service representative assigned to handle the specialized issue to which to route the unidirectional message.

6. The method of claim 1, wherein the unidirectional message comprises a message where a two-way communication is not established.

7. A computer-readable medium having computer-executable instructions stored thereon which, when executed by a computer, cause the computer to perform a method comprising:

receiving a unidirectional message associated with a return contact customer, the unidirectional message requesting a call center to return contact to the return contact customer;

searching content of the unidirectional message to determine whether the content comprises a request that does not require direct communication with a customer service representative;

in response to determining that the content of the unidirectional message does not comprise a request, modifying a generic customer service representative queue to add a representation of the unidirectional message to the generic customer service representative queue, wherein the generic customer service representative queue comprises a first on-hold customer representation for a first on-hold customer that is currently on-hold with the call center, and wherein the generic customer service representative queue defines a first order in which the return contact customer will be assisted by a first customer service representative assigned to handle generic messages, the first order specifying priority to the first on-hold customer over the return contact customer, searching a customer service database for customer service history information related to the return contact customer, wherein the customer service history information comprises customer service requests made by the return contact customer within a predetermined time period, retrieving the customer service history information, and presenting the customer service history information to the first customer service representative assigned to handle the generic messages once the unidirectional message arrives at a front of the generic customer service representative queue;

in response to determining that the content of the unidirectional message comprises a request, comparing the request to a list of requests associated with corresponding auto-responses to determine whether an auto-response exists corresponding to the request of the unidirectional message;

in response to determining that an auto-response corresponding to the request of the unidirectional message exists, retrieving the auto-response and inserting the auto-response into a response to the unidirectional message;

in response to determining that an auto-response corresponding to the request of the unidirectional message does not exist, searching the content of the unidirectional message to determine whether the content comprises a routing indicator corresponding to a specialized issue;

in response to determining that the content of the unidirectional message comprises a routing indicator, modifying a targeted customer service representative queue to add a representation of the unidirectional message to the targeted customer service representative queue, wherein the targeted customer service representative queue comprises a second on-hold customer representation for a second on-hold customer that is currently on-hold with the call center, and wherein the targeted customer service representative queue defines a second order in which the return contact customer will be assisted by a second customer service representative assigned to handle the specialized issue, the second order specifying priority to the second on-hold customer over the return contact customer; and in response to determining that the content of the unidirectional message does not comprise a routing indicator, modifying the generic customer service representative queue to add a representation of the unidirectional message to the generic customer service representative queue.

8. The computer-readable medium of claim 7, wherein the unidirectional message comprises a short message service message including a customer name and contact information associated with the customer.

9. The computer-readable medium of claim 7, further comprising computer-executable instructions stored thereon which, when executed by a computer, cause the computer to perform the method further comprising:

retrieving customer profile information associated with the return contact customer from a customer profile database in response to determining that the content of the unidirectional message does not comprise a request; and presenting the unidirectional message and the customer profile information to the first customer service representative assigned to handle the generic messages once the unidirectional message arrives at a front of the generic customer service representative queue.

10. The computer-readable medium of claim 7, further comprising computer-executable instructions stored thereon which, when executed by a computer, cause the computer to perform the method further comprising comparing the routing indicator to a list of routing indicators to determine the second customer service representative assigned to handle the specialized issue to which to route the unidirectional message.

11. A system for managing customer service requests, the system comprising:

a processor; and a memory comprising instructions that are executable by the processor, the instructions, when executed by the processor, cause the processor to receive a unidirectional message associated with a return contact customer, the unidirectional message requesting a call center to return contact to the return contact customer, search content of the unidirectional message to determine whether the content comprises a request that does not require direct communication with a customer service representative, in response to determining that the content of the unidirectional message does not comprise a request, modify a generic customer service representative queue to add a representation of the unidirectional message to the generic customer service representative queue, wherein the generic customer service representative queue comprises a first on-hold customer representation for a first on-hold customer that is currently on-hold with the call center, and wherein the generic customer service representative queue defines a first order in which the return contact customer will be assisted by a first customer service representative assigned to handle generic messages, the first order specifying priority to the first on-hold customer over the return contact customer, search a customer service database for customer service history information related to the return contact customer, wherein the customer service history information comprises customer service requests made by the return contact customer within a predetermined time period, retrieve the customer service history information, and present the customer service history information to the first customer service representative assigned to handle the generic messages once the unidirectional message arrives at a front of the generic customer service representative queue, in response to determining that the content of the unidirectional message comprises a request, compare the request to a list of requests associated with corresponding auto-responses to determine whether an auto-response exists corresponding to the request of the unidirectional message, in response to determining that an auto-response corresponding to the request of the unidirectional message exists, retrieve the auto-response and inserting the auto-response into a response to the unidirectional message, in response to determining that an auto-response corresponding to the request of the unidirectional message does not exist, search the content of the unidirectional message to determine whether the content comprises a routing indicator corresponding to a specialized issue, in response to determining that the content of the unidirectional message comprises a routing indicator, modify a targeted customer service representative queue to add a representation of the unidirectional message to the targeted customer service representative queue, wherein the targeted customer service representative queue comprises a second on-hold customer representation for a second on-hold customer that is currently on-hold with the call center, and wherein the targeted customer service representative queue defines a second order in which the return contact customer will be assisted by a second customer service representative assigned to handle the specialized issue, the second order specifying priority to the second on-hold customer over the return contact customer, and in response to determining that the content of the unidirectional message does not comprise a routing indicator, modify the generic customer service representative queue to add a representation of the unidirectional message to the generic customer service representative queue.

12. The system of claim 11, wherein the memory further comprises instructions that are executable by the processor and, when executed by the processor, cause the processor to:

retrieve customer profile information associated with the return contact customer from a customer profile database further in response to determining that the content of the unidirectional message does not comprise a request; and present the unidirectional message, contact information associated with the customer, and the customer profile information to the first customer service representative assigned to handle the generic messages once the unidirectional message arrives at a front of the generic customer service representative queue.

13. The system of claim 11, wherein the memory further comprises instructions that are executable by the processor and, when executed by the processor, cause the processor to compare the routing indicator to a list of routing indicators to determine the second customer service representative assigned to handle the specialized issue to which to route the unidirectional message in response to determining that the content of the unidirectional message comprises a routing indicator.

* * * * *